United States Patent

Lathrop

[15] 3,659,124
[45] Apr. 25, 1972

[54] LINEAR MOTION MOTOR WITH RECTANGULAR COIL CONSTRUCTION

[72] Inventor: Raymond Lathrop, Canoga Park, Calif.
[73] Assignee: Vernitron Corporation, Great Neck, N.Y.
[22] Filed: Sept. 28, 1970
[21] Appl. No.: 75,861

[52] U.S. Cl. .................................................. 310/13, 310/27
[51] Int. Cl. ........................................................ H02k 41/00
[58] Field of Search ....................... 310/12–14, 27, 310/15, 21; 179/115.5, 115 UC

[56] References Cited

UNITED STATES PATENTS

| | | | |
|---|---|---|---|
| 3,161,793 | 11/1971 | Laithwaite | 310/27 |
| 3,505,544 | 4/1970 | Helms | 310/14 |
| 2,846,520 | 8/1958 | Browncombe | 179/115.5 |
| 2,842,688 | 7/1958 | Martin | 310/27 |
| 2,636,139 | 4/1953 | Winget | 310/12 |
| 3,067,404 | 12/1962 | Hildebrandt | 310/27 |
| 3,106,653 | 10/1963 | Fowler | 179/115.5 |

OTHER PUBLICATIONS

IBM Tech. Dicl. Bulletin, page 2,273, Vol. 12, No. 12, May 1970, " High Force Const. Voice Coil Motor...," Rexford

*Primary Examiner*—J. D. Miller
*Assistant Examiner*—R. Skudy
*Attorney*—Edward H. Loveman

[57] ABSTRACT

A linear motion motor includes a reciprocatable armature carried by a stator comprising a plate with four parallel non-magnetic rods. A rectangular coil is wound on the rods and is supported thereby only at inside corners of the coil. The stator includes a permanent bar magnet secured at one end to one end wall of a U-shaped magnetic frame. The other end of the bar magnet is formed with a rectangular pole piece disposed inside a rectangular hole in the other end wall of the frame. The coil extends longitudinally between the air gap defined between the edges of the pole piece and hole in the other end wall. The rods are slidably engaged in corner notches formed in the pole piece.

4 Claims, 6 Drawing Figures

PATENTED APR 25 1972

3,659,124

INVENTOR.
RAYMOND LATHROP

BY Edward H. Loveman
ATTORNEY

{ 3,659,124 }

LINEAR MOTION MOTOR WITH RECTANGULAR COIL CONSTRUCTION

This invention concerns a linear motion motor having a permanent magnet stator and more specifically with a linear motion motor having a permanent magnet stator and a reciprocating armature with a rectangular coil.

Heretofore linear motion motors have generally employed stators provided with cylindrical coils, and an axially reciprocating permanent magnet armature. The prior construction has a number of disadvantages such as excessively large air gaps which reduce the maximum flux density and force producing capability; excessive eddy currents which cause power losses during periods of motion; excessive heating due to the round coil structure encircling the armature, limited coil length due to cylindrical configuration of the stator and consequent reduction in force per unit of current drawn and power consumed, complex structure, high manufacturing cost, etc.

The present invention is directed at overcoming the above and other difficulties and disadvantages of prior linear motion motors, and in addition providing a linear motion motor with improved performance for a given size with reduced power consumption. According to the invention there is provided a linear motion motor, based on the principle of producing a linear force or torque by interaction between a permanent magnet and a coil carrying a unidirectional current (D.C.). The force produced is directly proportional to the product of the magnetic flux density and the magnitude of current carried by the coil. Since the magnetic flux density is unidirectional and of constant value, the direction of force is determined by the directional sense or polarity of the current in the coil.

The device embodying the invention employs a stator frame which is rectangularly U-shaped, with a rectangular permanent magnet core extending from one end of the frame to a rectangular hole in the other end of the frame. A pole piece as defined by a flange on the free end of the core is formed with curved corner notches. The armature comprises a rectangular apertured end plate carrying at its corners four cylindrical non-magnetic rods which are slidably engaged in the corner notches of the pole piece. A shaft or other driven load may be attached to the end plate of the armature. Wound on the non-magnetic rods is a rectangular, helical coil to the terminals of which is applied a D. C. current. When the electric current flows in one direction the armature moves axially outward of the stator frame. When the current flow is reversed the armature moves inwardly of the stator frame.

The principal object of the present invention is to provide a linear motion of improved performance and reduced power consumption.

Another object of the present invention is to provide a linear motion motor having a rectangular coil supported only at its corners.

Another object of the present invention is to provide a linear motion motor having a rectangular core supported at its corners thereby resulting in a maximum flux density for a given size and magnet structure.

A still further object is to provide an improved linear motion motor having an improved force per ampere of current drawn, minimal power consumption and a large overall efficiency of operation.

These and other objects and many of the attendant advantages of this invention will be readily appreciated as the same becomes better understood by reference to the following detailed description when considered in connection with the accompanying drawings in which.

Figure 2:
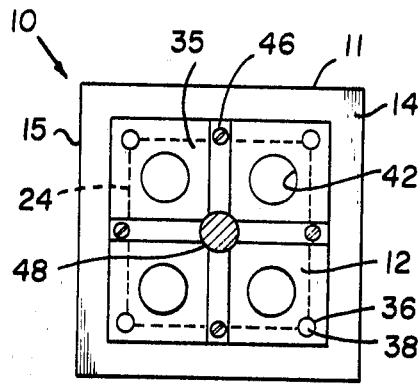
FIG. 2 is a cross-sectional view taken along line 2—2 of FIG. 1.
Figure 1:
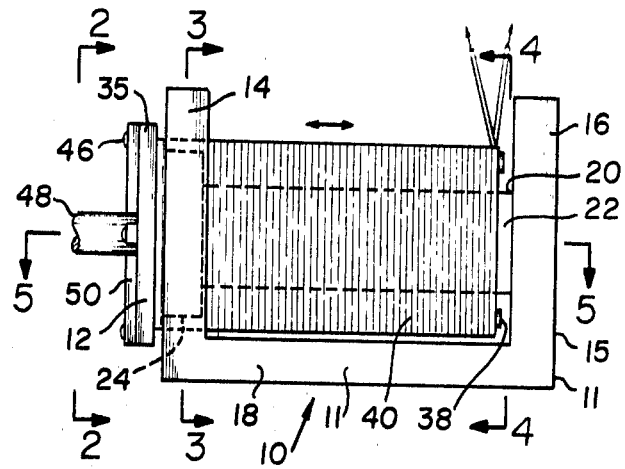
FIG. 1 is a side view of a linear motion motor embodying the instant invention.
Figure 3:
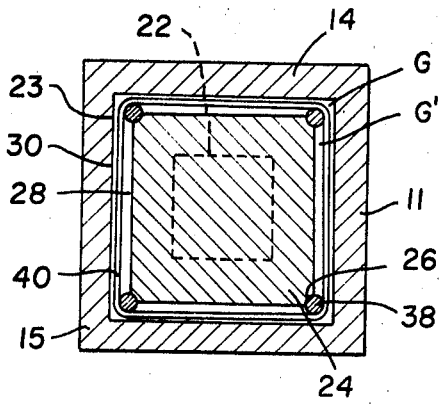
FIG. 3 is a cross-sectional view taken along line 3—3 of FIG. 1.
Figure 5:
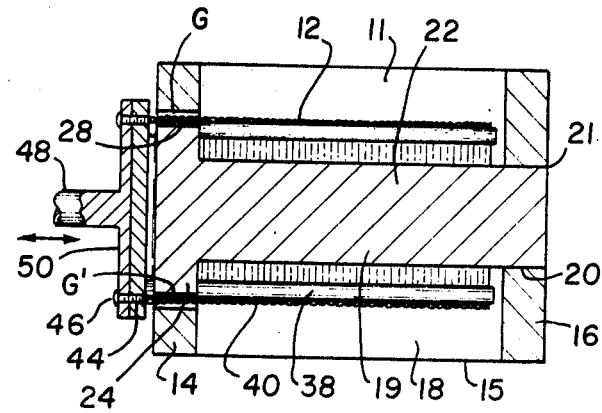
FIG. 5 is a longitudinal sectional view taken along line 5—5 of FIG. 1.
Figure 4:
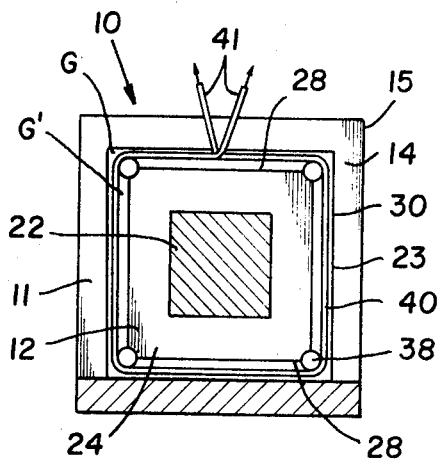
FIG. 4 is a cross sectional view taken along line 4—4 of FIG. 1.
Figure 6:
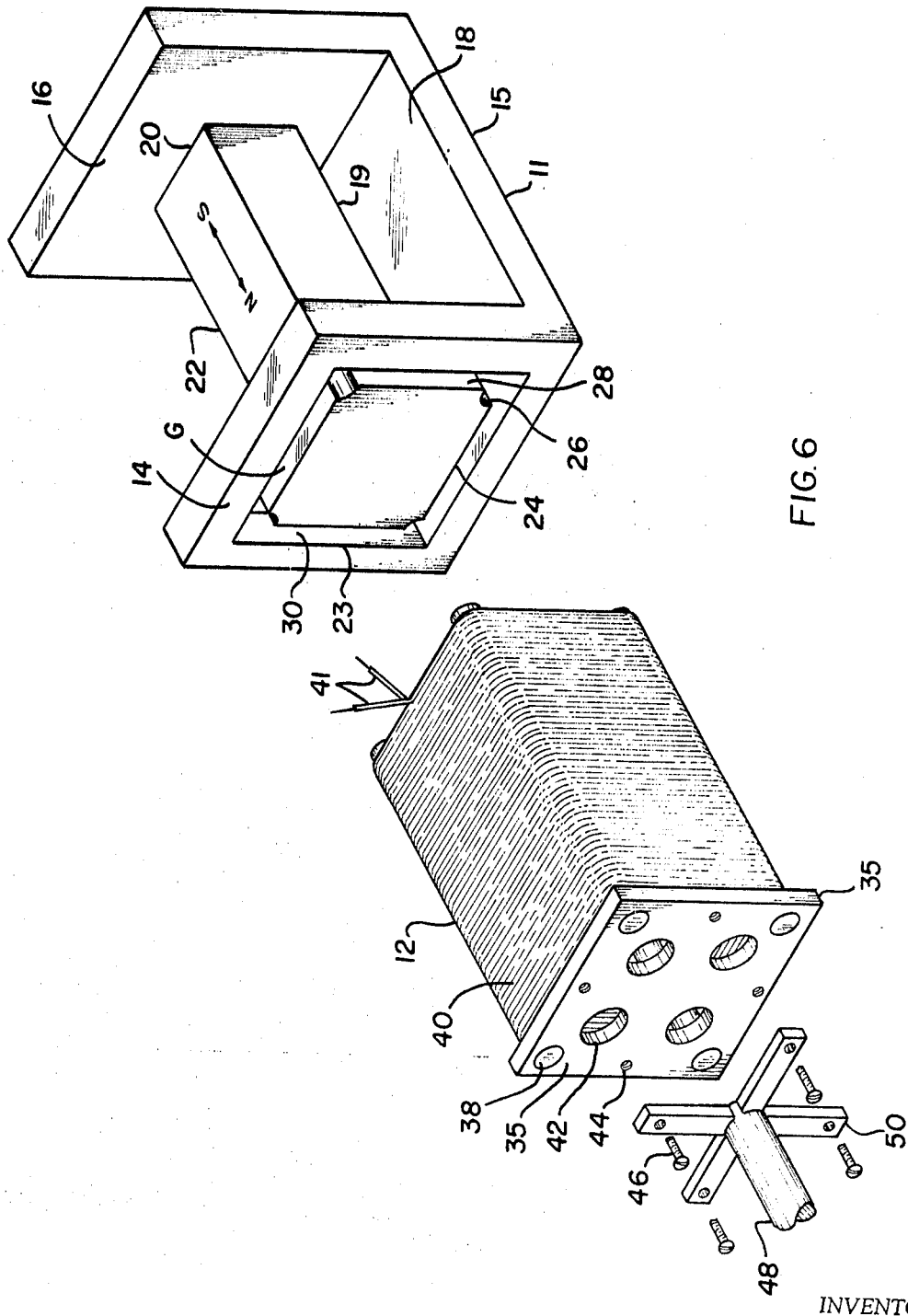
FIG. 6 is an exploded perspective view of the parts of the motor of FIGS. 1-5.

Referring now to the drawings wherein like reference characters designate like or corresponding parts throughout, there is illustrated in FIG. 1-6 a linear motion motor generally designated by reference numeral 10 having a stator 11 and an armature 12. The stator comprises a rectangular U-shaped frame 15 made of magnetic material such as soft iron or the like. The frame has parallel rectangular or square end plates or walls 14, 16 integral with a flat rectangular base plate or wall 18. End plate or wall 16 is formed with a rectangular hole 20 in which is set one end 21 (FIG. 5) of a rectangular bar magnet 19 which serves as a core 22 for the stator. The core 22 is formed with a rectangular pole piece 24 at its opposite end and comprises a flange which extends radially outward of the core 22. The pole piece 24 is disposed within a rectangular or square hole 23 formed in the end wall or plate 14 of the stator frame. The end walls 14, 16 and base plate 18 serve as a magnetic flux return path cooperating with the pole piece 24. The corners of the pole piece 24 are formed with concave, quarter cylindrical notches 26 and each of the four edges 28 are spaced from an inner edge 30 of the end wall 14. The pole piece 24 is coplanar with the wall 14 to define a narrow rectangular passage G all around the pole piece 24. The N and S poles of the core 22 are at opposite ends of the bar magnet 19. By the arrangement described, a permanent magnetic circuit is maintained between the ends of core 22 via frame 15 and the passage G between the pole pieces 14, 24.

The reciprocating armature 12 is comprised of a rectangular or square end plate 35 which is slightly larger than hole 23. At corners of the plate 35 are holes 36 into which are secured by any conventional means the ends of four non-magnetic rods 38 which extend perpendicular to plate 35. The rods 38 are parallel to each other and of equal length. Inner sides of the rods are slidably engaged in the curved notches 26 at the corners of the pole piece 24 and form part of the magnetic circuit between pole piece 24 and wall 14. Wound on the rods for substantially their entire length is an insulated wire coil 40. This coil is rectangular in cross section as clearly shown in FIGS. 3, 4, and 6. The air gap G', defined between the coil 40 and the edge of the pole piece 24 is very minute, being just sufficient to permit free longitudinal reciprocating movement of the armature in the stator. This minimal air gap optimizes the magnetic flux density, and improves torque and overall efficiency. Holes 42 are provided in plate 35 to vertilate the interior of the armature, and thus minimize the working temperature of the assembly, and to minimize the mass of the armature.

Threaded holes 44 are provided in the plate 35 to receive screws 46 by means of which a driven shaft 48 having a pair of apertured spider arms 50 may be attached to the armature 12 for reciprocating movement therewith and to maintain the air gap G'. A unidirectional current may be applied to ends or terminals 41 of coil 40. In one direction of current flow the armature will move axially outward of the stator. Reversing the direction of current flow will reverse the direction of movement of the armature longitudinally of the stator.

The device is characterized by relative simplicity of construction, rugged structure, economy in manufacture, reliability in operation, improved operating efficiency, ease of assembly, etc.

It should be understood that the aforegoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A linear motion motor comprising
a stator having a rectangular U-shaped magnetic frame with parallel end walls, a first one of said walls having a rectangular hole therein to define a first pole piece, a permanent bar magnet secured at one end to the second of said end walls and extending perpendicuarly thereto toward said first end wall, said bar magnet terminating in a rectangular second pole piece disposed inside said hole coplanar with said first end wall, said second pole piece being peripherally spaced from said hole to define a rectangular air gap thereat, a reciprocal armature supported by said stator, said armature comprising a rectangular helical coil insulated wire extending longitudinally through said air gap to enclose said bar magnet and said second pole piece; and a coil support means comprising a flat rectangular shaped plate and four rods secured at one end thereof near each of the corners of said plate and extending parallel to each other and perpendicular to said plate, said coil being wound on said rods and wherein said second pole piece has corner notches formed therein, said rods being respectively slidably engaged in said notches.

2. A linear motion motor as defined in claim 1, further comprising a driven member attached to said plate and reciprocatable with said armature.

3. A linear motion motor as defined in claim 1, wherein said coil has end terminals to which a reversible direct current source may be connected, so that said armature moves axially in one direction by magnetic interaction with the magnet when the current flows in one direction, and said armature moves axially in an opposite direction when the current flow is reversed.

4. A linear motion motor as defined in claim 2, wherein said plate supporting said coil is slightly larger than said hole in said end wall to serve as an abutment limiting inward movement of said armature into said stator, said plate having holes for ventilating the interior of said coil and, attaching said driven member to said armature, thereby minimizing the mass of said armature.

* * * * *